United States Patent
Maniatakos et al.

(10) Patent No.: US 9,619,658 B2
(45) Date of Patent: Apr. 11, 2017

(54) HOMOMORPHICALLY ENCRYPTED ONE INSTRUCTION COMPUTATION SYSTEMS AND METHODS

(71) Applicant: New York University, New York, NY (US)

(72) Inventors: Michail Maniatakos, Abu Dhabi (AE); Nektarios Georgios Tsoutsos, New York, NY (US)

(73) Assignee: New York University, New York, NY (US)

( * ) Notice: Subject to any disclaimer, the term of this patent is extended or adjusted under 35 U.S.C. 154(b) by 45 days.

(21) Appl. No.: 14/590,782

(22) Filed: Jan. 6, 2015

(65) Prior Publication Data

US 2015/0193628 A1  Jul. 9, 2015

Related U.S. Application Data

(60) Provisional application No. 61/924,596, filed on Jan. 7, 2014.

(51) Int. Cl.
G06F 21/60 (2013.01)
G06F 21/71 (2013.01)

(52) U.S. Cl.
CPC .................. G06F 21/602 (2013.01)

(58) Field of Classification Search
CPC ................ G06F 21/602; G06F 21/71
See application file for complete search history.

(56) References Cited

U.S. PATENT DOCUMENTS

| 8,897,449 | B1* | 11/2014 | Broadbent | H04L 9/0891 380/277 |
| 2011/0110525 | A1* | 5/2011 | Gentry | H04L 9/0822 380/285 |
| 2011/0264920 | A1* | 10/2011 | Rieffel | H04L 9/008 713/189 |
| 2012/0066510 | A1* | 3/2012 | Weinman | H04L 9/008 713/189 |
| 2012/0278622 | A1* | 11/2012 | Lesavich | G06F 17/30864 713/168 |
| 2013/0097417 | A1* | 4/2013 | Lauter | H04L 9/008 713/150 |

(Continued)

OTHER PUBLICATIONS

Craig Gentry, "Fully Homomorphic Encryption Using Ideal Lattices", pp. 169-178.*

(Continued)

*Primary Examiner* — Yonas Bayou
(74) *Attorney, Agent, or Firm* — Foley & Lardner LLP

(57) ABSTRACT

A homomorphically encrypted one instruction computation ("HEROIC") computing system is described. The described HEROIC cloud computing system utilizes a homomorphic encryption scheme. The homomorphic encryption scheme allows for meaningful manipulation of encrypted data directly within the encrypted domain (i.e., without the need to first decrypt the data and then re-encrypt the data after processing). The HEROIC cloud computing system eliminates the need for the cloud computing processor to first decrypt data prior to processing thereby eliminating the need for the cryptographic keys to be provided to the provider of the cloud computing system.

17 Claims, 8 Drawing Sheets

(56) References Cited

U.S. PATENT DOCUMENTS

| | | | | |
|---|---|---|---|---|
| 2013/0097431 A1* | 4/2013 | Hriljac | ................ | G06F 8/52 |
| | | | | 713/189 |
| 2013/0275752 A1* | 10/2013 | Zhang | ................ | H04L 9/008 |
| | | | | 713/167 |
| 2013/0339722 A1* | 12/2013 | Krendelev | ............ | H04L 9/008 |
| | | | | 713/150 |
| 2014/0075183 A1* | 3/2014 | Wang | ................ | G06F 19/22 |
| | | | | 713/150 |
| 2014/0115321 A1* | 4/2014 | Isshiki | ............ | H04L 9/3073 |
| | | | | 713/153 |
| 2014/0185794 A1* | 7/2014 | Yasuda | ............ | H04L 9/008 |
| | | | | 380/28 |
| 2014/0185797 A1* | 7/2014 | Yasuda | ............ | H04L 9/008 |
| | | | | 380/44 |

OTHER PUBLICATIONS

C. Gentry, A fully homomorphic encryption scheme, Ph.D. thesis, Stanford University, 2009.*
C. Gentry, "Fully homomorphic encryption using ideal lattices," in ACM Symposium on Theory of Computing, 2009, pp. 169-178.*
"Securing the cloud with homomorphic encryption", 2014.*
Katja et al., "Paillier's Cryptosystem Modulo p2q and Its Applications to Trapdoor Commitment Schemes", pp. 296-313.*
Paillier, P., "Public-Key Cryptosystems Based on Composite Degree Residuosity Classes", J. Stern (Ed.): EUROCRYPT'99, LNCS 1592, pp. 223,-238, 1999.

* cited by examiner

HOMOMORPHICALLY ENCRYPTED ONE INSTRUCTION COMPUTATION SYSTEMS AND METHODS

CROSS-REFERENCE TO RELATED APPLICATIONS

This application claims priority to U.S. Provisional Patent Application Ser. No. 61/924,596 entitled, "HOMOMORPHICALLY ENCRYPTED ONE INSTRUCTION COMPUTATION," filed on Jan. 7, 2014, which is hereby incorporated by reference in its entirety and for all purposes.

BACKGROUND

As cloud computing services become more and more affordable, the option of outsourcing computationally demanding applications is very appealing to individuals and companies. The benefits of performing computation in cloud computing environments typically include great scalability, minimal maintenance and upgrade costs, as well as all-in-one and pay-as-you-go service options. Unfortunately, these benefits are sometimes outweighed by concerns about data privacy in the cloud. For example, recent security breaches and threats on the cloud provider end, such as known attacks to Amazon EC2/S3 (2011), to LastPass (2011), as well as to Dropbox (2012) have raised concerns over the security of data stored in cloud computing systems. Moreover, on the infrastructure end, the known exploits to popular cloud technologies keep increasing.

In contrast to privately owned datacenters, where many logical and physical controls ensure the privacy of the data and executed programs, in a cloud setting, users are asked to trust a third-party computing services provider with full control on their sensitive information. This is only possible as long as end users trust the reputation of the cloud provider itself and have studied the provider's safety record. In case the risk of handing over sensitive information to a cloud provider is not acceptable, users need to incur the usually much higher costs of building and maintaining private datacenters. One solution towards addressing the security concerns of cloud computing systems is the use of encryption on data stored in the cloud computing systems (e.g., the implementation of an encryption scheme). Encryption requires the use of cryptographic keys in order to read the encrypted data. Accordingly, the use of encryption renders data stored in the cloud computing systems information unreadable to unauthorized entities, and can protect the confidentiality of sensitive data.

In order to perform various processing tasks on the stored data in the cloud environment, the cloud computing system processors are programmed with the cryptographic keys. The processors first decrypt the data with the cryptographic keys, perform the processing tasks, and then re-encrypt the data for storage in the cloud computing system. In such systems, the attack surface (i.e., the vulnerability of the cloud computing system) is substantially limited to data within the processor itself. Although this data is typically secure, the data is still theoretically vulnerable to attackers (e.g., hackers) capable of eavesdropping on the data pipeline within the processor or leaking the cryptographic keys stored within the processor, without triggering the tampering protections. Such attack proposals are possible with the use of a sub-transistor level attack, such as an attack by a Trojan virus, which can extract sensitive information from the internals of the processor. For example, the sub-transistor level attack may extract the cryptographic keys stored within the processor or the decrypted data passing through a data pipeline on the processor. Thus, there is a need for protecting the confidentiality of the information processed in cloud computing systems in a more definitive and effective manner.

SUMMARY

One embodiment relates to a method of manipulating data in the encrypted domain. The method includes receiving, by an electronic processor, encrypted instructions and encrypted data. The method further includes manipulating, by the electronic processor, the encrypted data based at least on the encrypted instructions. The method includes generating, by the electronic processor, modified encrypted data based at least on the manipulation of the encrypted data.

Another embodiment relates to a computing system. The system includes one or more processors. The one or more processors are configured to receive encrypted instructions and encrypted data. The one or more processors are further configured to manipulate the encrypted data based at least on the encrypted instructions. The one or more processors are configured to generate modified encrypted data based at least on the manipulation of the encrypted data.

A further embodiment relates to a cloud computing system. The cloud computing system includes a cloud storage database. The cloud computing system further includes a network interface configured to send data and to receive data from a plurality of user devices over a network. The cloud computing system includes a memory and at least one processor. The at least one processor is configured to receive encrypted data from one of the plurality of user devices. The encrypted data is encrypted with a homomorphic encryption scheme. The at least one processor is further configured to manipulate the encrypted data without decrypting the encrypted data. The at least one processor is configured to generate modified encrypted data based at least on the manipulation of the encrypted data. The at least one processor is further configured to store the modified encrypted data in the cloud storage database.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring generally to the figures, a homomorphically encrypted one instruction computation ("HEROIC") computing system is described. As described above, traditional cloud computing systems that employ traditional encryption schemes are susceptible to attackers (e.g., hackers) capable of eavesdropping on the data pipeline within the cloud computing system processor or leaking the cryptographic keys stored within the processor, without triggering the tampering protections. However, the described HEROIC cloud computing system utilizes a homomorphic encryption scheme. The homomorphic encryption scheme allows for meaningful manipulation of encrypted data directly within the encrypted domain (i.e., without the need to first decrypt the data and then re-encrypt the data after processing). Accordingly, the HEROIC cloud computing system eliminates the need for the cloud computing processor to first decrypt data prior to processing thereby eliminating the need for the cryptographic keys to be provided to the provider of the cloud computing system. The HEROIC cloud computing system is thus not susceptible to attackers (e.g., hackers) capable of eavesdropping on the data pipeline within the cloud computing system processor or leaking the cryptographic keys stored within the processor, without triggering the tampering protections. In some arrangements, the HEROIC cloud computing system utilizes a processor that is natively capable of HEROIC. In other arrangements, the HEROIC cloud computing system utilizes a legacy processor, such as a reduced instruction set computing ("RISC") architecture processor or a complex instruction set computing ("CISC") architecture processor found on current cloud computing systems). In such arrangements, the HEROIC architecture is employed in a virtual machine executed by the legacy processor.

Figure 1:
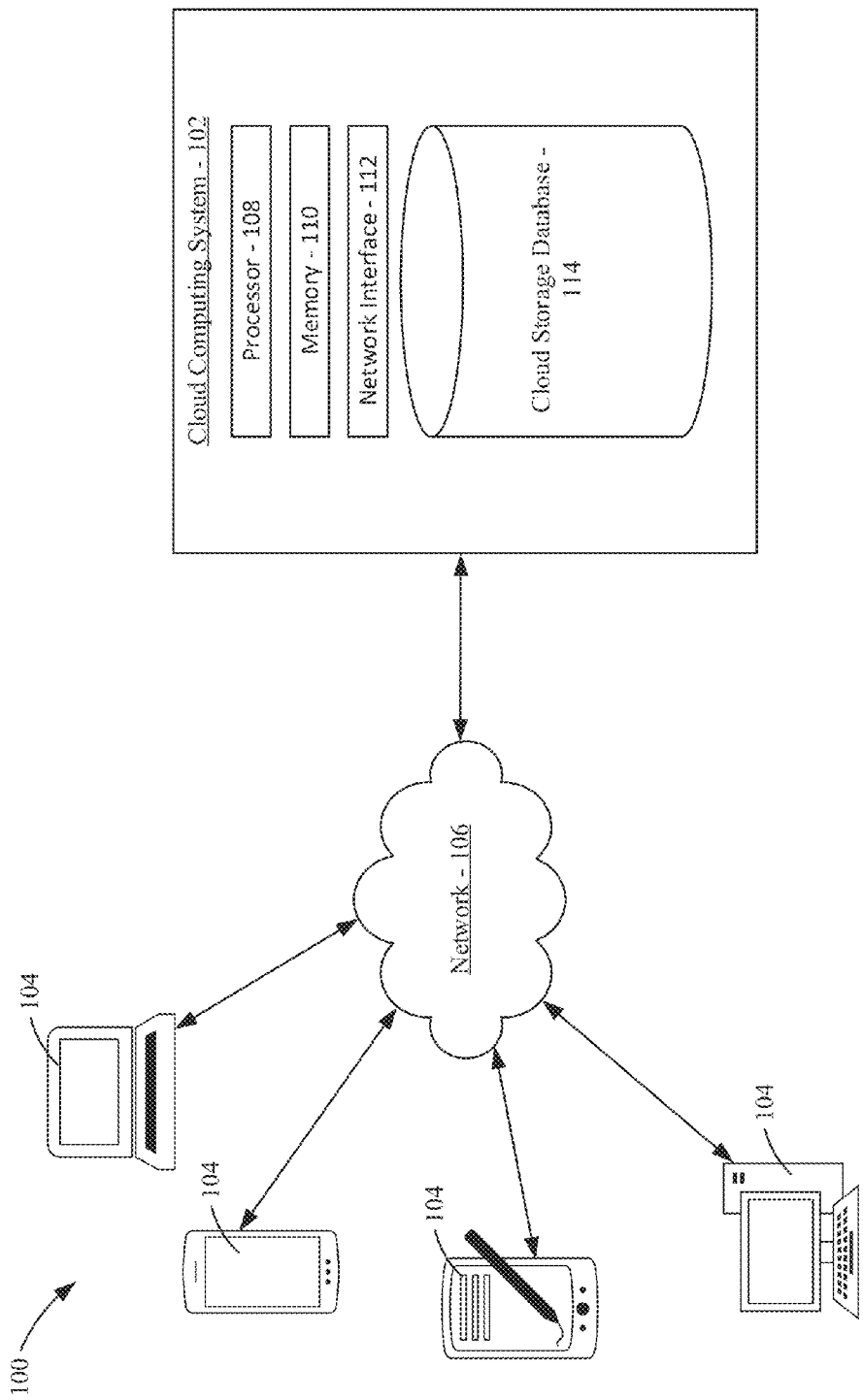
FIG. 1 is block diagram of a computing system according to an exemplary embodiment.

Referring to FIG. 1, a block diagram of a computing system 100 is shown according to an exemplary embodiment. The computing system 100 includes a cloud computing system 102. The cloud computing system 102 provides cloud computing services to a plurality of user devices 104 over a network 106. The cloud computing services may include any of remote data storage services, remote data processing services, website hosting services, hosted desktop services, and the like. The user devices 104 may include any of desktop computers, laptop computers, tablet computing devices, smartphones, PDAs, thin clients, and the like. In some arrangements, the network 106 is the internet.

The cloud computing system 102 includes a processor 108 and memory 110. The memory 110 includes programming modules and logic that, when executed by the processor 108, control the operation of the cloud computing system 102. The programming modules and logic include HEROIC architecture logic that enables the processor 108 of the cloud computing system 102 to manipulate encrypted data directly within the encrypted domain such that both the private and public encryption keys may be kept private by the end user. The HEROIC architecture may include an additive homomorphic encryption scheme, such as the Paillier scheme. In some arrangements, the processor 108 operates on a one instruction set computing ("OISC") architecture that is designed to support only one computing instruction. In such arrangements, the processor 108 is capable of Turing-complete computation. For example, the processor 108 may achieve Turing-complete computation by employing a subtract and branch if less than or equal to zero ("subleq") instruction set, a subtract and branch if negative ("sbn") instruction set, an add and branch unless positive ("addleq") instruction set, a plus one and branch if equal ("p1eq") instruction set, or a reverse subtract and skip if borrow instruction set. In arrangements where the processor 108 utilizes a OISC architecture, no virtual machine is required due to the OISC architecture compatibility with homomorphic encryption schemes. In some arrangements, the processor 104 operates on a RISC or CISC architecture. In such arrangements, the use of a virtual machine executing on the processor 108 is needed to emulate a Turing-complete OISC processor in order to employ the HEROIC architecture. The processor 108 is capable of implementing at least four operations: reading from memory, writing to memory, branching, and incrementing a value in the encrypted domain. Any look-up tables utilized by the processor 108 in performing branch decisions may be randomly permuted and poisoned with additional (i.e., noise) values that are not used by the processor 108 during runtime in order to provide further security of the data in the cloud computing system 102.

The cloud computing system 102 includes a network interface 112. The network interface 112 allows the cloud computing system to send data to and to receive data from the user devices 104 over the network 106. The network interface may include any combination of wired network connections (e.g., Ethernet, fiber optic, etc.) and wireless network connections (e.g., 802.XX, WiFi®, ZibBee®, Bluetooth®, etc.).

The cloud computing system 102 also includes a cloud storage database 114. The cloud storage database 114 stores and maintains data. In some arrangements, the cloud storage database 114 is comprised of multiple backend data servers in communication with the cloud computing system 102. The data in the cloud storage database is encrypted according to a homomorphic encryption scheme. In some arrangements, the data is encrypted at a word level of granularity, which eliminates the need for eventual decryption as in larger block encryption in situations where individual words of data need to be separated and individually processed. Both instructions and data words may be encrypted. Additionally, the memory references of data stored in the cloud storage database 114 are encrypted with the homomorphic encryption scheme such that the encryption of the memory addresses are the same every time. As described in further detail below, the homomorphic encryption scheme enables the processor 108 of the cloud computing system 102 to directly manipulate the homomorphically encrypted data without the need to first decrypt the data. Accordingly, the data within the cloud computing system 102 is not susceptible to attackers while being stored within the cloud storage database 114 or during manipulation by the processor 108.

As noted above, the cloud computing system 102 may utilize a Paillier encryption scheme in employing the HEROIC architecture of the cloud computing system 102. The Pallier scheme is an efficient homomorphic encryption scheme that supports the addition operation. The Pallier scheme is mathematically based on the decisional composite residuosity assumption. The decisional composite residuosity assumption is a mathematical assumption that states that given a composite number ("n") and an integer ("z"), it is hard to decide whether z is a n-residue modulo $n^2$ or not (i.e., whether there exists y such that $z \equiv y^n \pmod{n^2}$). The Paillier encryption scheme is homomorphic and therefor allows for encrypted computation in the HEROIC framework. The Paillier encryption scheme is described in further detail in "Public-Key Cryptosystems Based on Composite Degree Residuosity Classes," by Pascal Paillier, published in *Advances in cryptology—EUROCRYPT*99, pages 223-238, which is herein incorporated by reference in its entirety.

The specifics of the HEROIC framework utilized by the cloud computing system 102 are described in further detail below. The HEROIC framework enables the cloud computing system 102 to execute encrypted programs and to manipulate encrypted data without decrypting the programs and data. The HEROIC architecture is based on single instruction architecture that provides Turing-complete computation via the subleq or addleq instructions set. For simplicity, the following description assumes a subleq instruction set. However, the same principals can be applied to a system utilizing the addleq instruction set. As described above, the single instruction architecture is run natively on the processor 108 in arrangements where the processor 108 is based on OISC architecture or is run via a virtual machine executed by the processor 108 in arrangements where the processor 108 is based on RISC or CISC architecture.

Figure 2A:
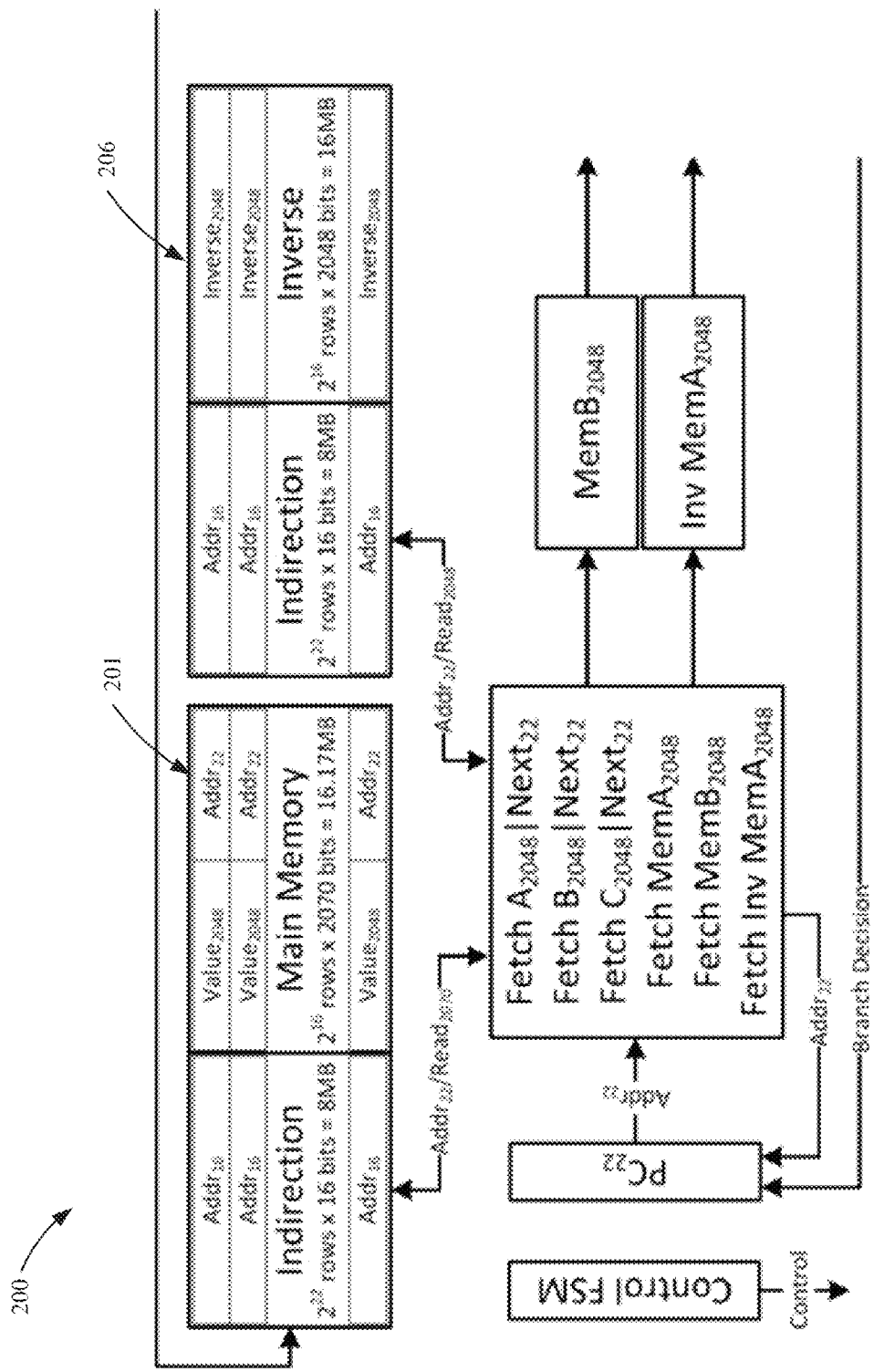
FIGS. 2A and 2B show a block diagram of a homomorphically encrypted one instruction computation computing architecture according to an exemplary embodiment.
Figure 2B:
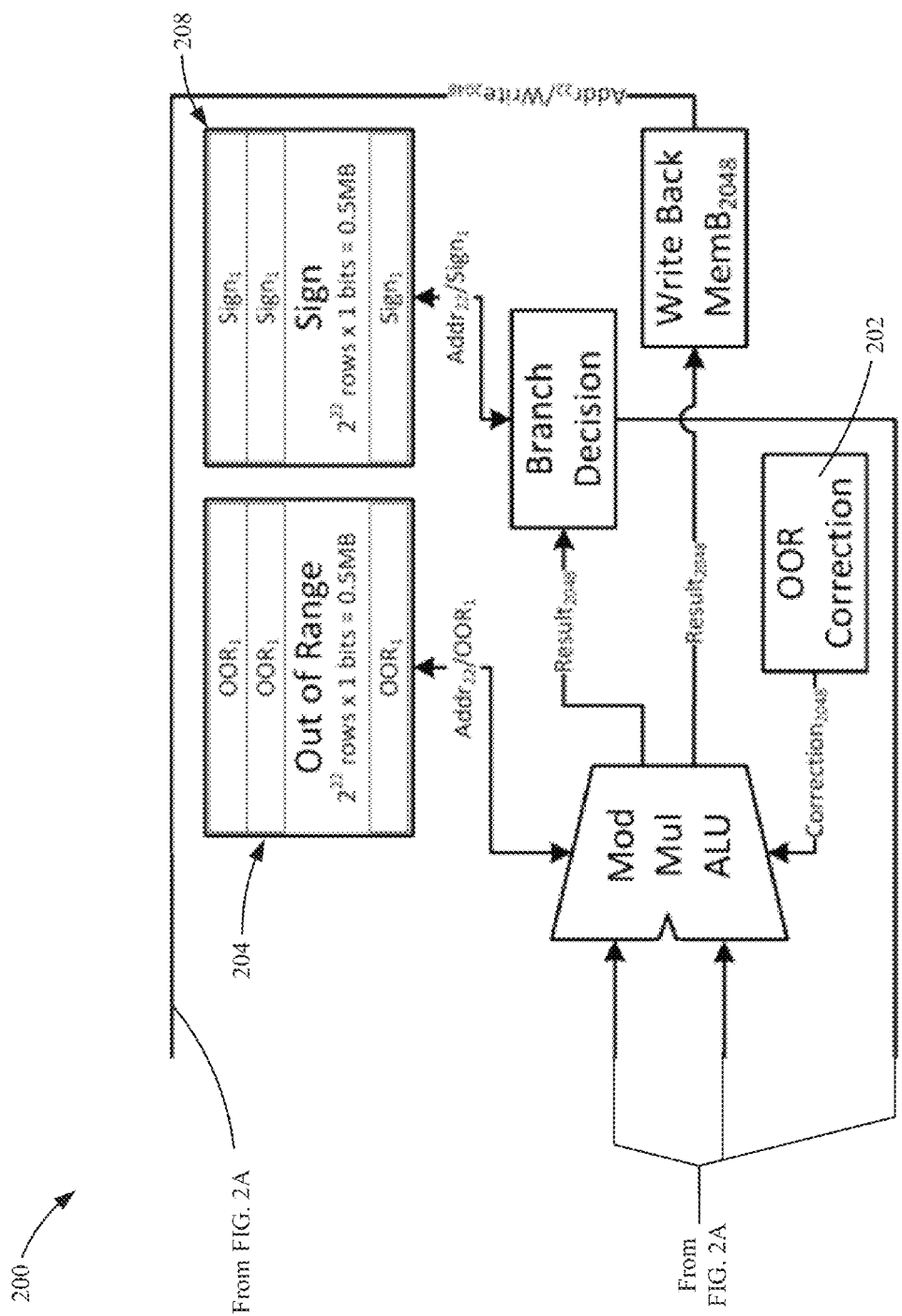

Referring to FIGS. 2A and 2B, a block diagram of a HEROIC computing architecture 200 is shown according to an exemplary embodiment. The block diagram of the HEROIC computing architecture 200 provides an abstract view of the various programming modules and memories of the cloud computing system 102. The HEROIC computing architecture 200 has a 1024 bit security parameter.

Encrypted Memory Addressing

In the HEROIC computing architecture 200, encrypted instruction arguments may be used as indirect references to memory locations. Since HEROIC uses a unified main memory for instructions and data, and because instructions are allowed to reference and homomorphically modify encrypted arguments of other instructions (which later can be used again for memory referencing), the HEROIC computing architecture 200 requires all memory addresses to be encrypted. As a result, the program counter ("PC") uses encrypted values to reference instruction arguments in the memory. For consistency in addressing, and given that the decryption key is not provided, it is necessary that all memory addresses are encrypted under the same cryptographic key.

Machine Instruction Arguments

Since the HEROIC computing architecture 200 employs a unified memory for both instructions and data, and since the instruction arguments are indistinguishable from data (e.g., because both the instruction arguments and the data are encrypted), a mechanism for matching arguments A, B, and C of the same instruction is required. Further, a proper sequence of arguments in the unencrypted domain would become permuted in the encrypted domain, as encryption of addresses does not preserve their absolute order since encrypted addressing is used. This issue is solved by matching each encrypted element inside the main memory, with the encrypted memory address of its next element, which provides each memory item with a pointer to the next item. This concept is shown in the top left, third column of the main memory 201 of FIG. 2A. The value of this pointer is the one used by the PC to find the next instruction argument in the execution trail because simply incrementing the PC would point the system to the incorrect address.

Out of Range Correction

Figure 3:
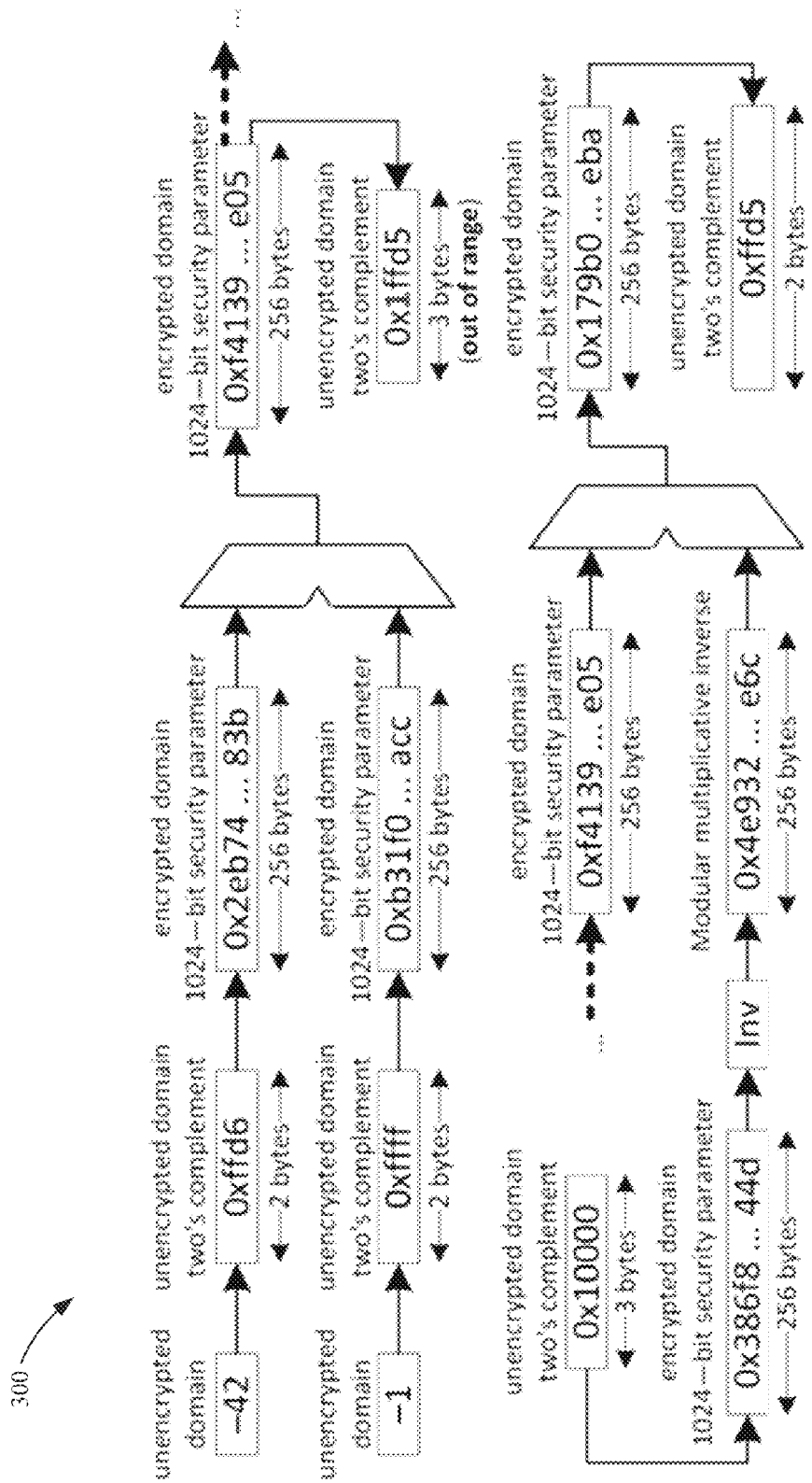
FIG. 3 is shows a flow diagram of a method of homomorphically adding two negative numbers (−42 and −1) according to an exemplary embodiment.

For simplicity and without loss of generality, a 16-bit single instruction architecture ported to the encrypted domain is described. Accordingly, the width of each memory location (before encryption) is 16 bits, which is equal to the size of each memory address. The representation of negative numbers follows the standard two's complement approach, and thus the range of supported numbers is from negative $2^{15}$ to ($2^{15}-1$). The range difference, however, between the unencrypted 16-bit and the encrypted (up to 2048-bit, for a security parameter of 1024-bit for Pailler encryptions) creates out of range ("OOR") discrepancies that require correction. For example, FIG. 3 shows a flow diagram of a method 300 of homomorphically adding two negative numbers (−42 and −1) according to an exemplary embodiment. As demonstrated in method 300, the addition of −42 with −1, which corresponds to adding ($2^{16}-42$) with ($2^{16}-1$), results to the encryption of ($2^{17}-43$). The addition does not result in the encryption of ($2^{16}-43$), which is the correct two's complement representation of −43. This OOR effect, is an artifact of the different ranges in the encrypted and the unencrypted domains. The inconsistency is corrected by adding the modular multiplicative inverse of the encryption of $2^{16}$ (given to HEROIC with the encrypted program), in order to achieve the expected result. This method 300 of operation is shown in FIG. 2B at 202 where an OOR correction multiplicative inverse provided to the ALU. However, prior to correcting the OOR effect, the OOR is first detected by using an out of range lookup memory that matches the encryptions of all numbers from 0 to $2^{17}$ with one bit of information indicating "above $2^{16}-1$" or below. As soon as the ALU result is matched with an entry above $2^{16}-1$, a secondary addition with the modular multiplicative inverse corrects the result. The OOR lookup memory is shown in FIG. 2B at 204.

Homomorphic Subtraction

When the HEROIC computing architecture 200 uses the subleq instruction set, the HEROIC computing architecture 200 requires an ALU that performs homomorphic subtraction. The Paillier scheme, however, ensures that the modular multiplication of two ciphertexts generates a value, which when decrypted, corresponds to the modular addition of the respective plaintexts (i.e. homomorphic addition). Thus, in order to achieve homomorphic subtraction, the modular multiplicative inverse of the subtrahend needs to be homomorphically added to the minuend, and this operation still preserves the homomorphic properties of the scheme.

The modular multiplicative inverse, however, cannot be efficiently retrieved algebraically given an encrypted value. Thus, an inverse lookup memory (similar to the out of range lookup memory presented earlier) is necessary. This memory returns the multiplicative inverse of the encrypted value of the subtrahend (shown as 206 of FIG. 2A). The retrieved inverse, along with the minuend, is used by the ALU to perform modular multiplication and generate the expected homomorphic subtraction output. This result is then subject to "out of range" correction as described earlier with respect to method 300 of FIG. 3.

Alternatively, when the HEROIC computing architecture 200 uses the addleq instruction, the subtraction operation is replaced by addition. In this case, the inverse lookup memory 206 is not needed, since the addition operation is directly supported by the Paillier scheme. A potential setback when using addleq is that it is significantly harder to program because a high level compiler is not currently available, and is less efficient in terms of programming compared to subleq.

Memory Addressing Size

A security parameter size of 1024 bits combined with encrypted memory addressing requires memory address support of 2048 bits in width. Such memory would have a prohibitive cost and is not actually necessary, since, in the unencrypted domain, 16 bits of address size suffice for proper execution. The HEROIC computing architecture 200 can employ one of three memory optimizations, each of which effectively reduce the required memory addressing size to a practical implementation.

Figure 4:
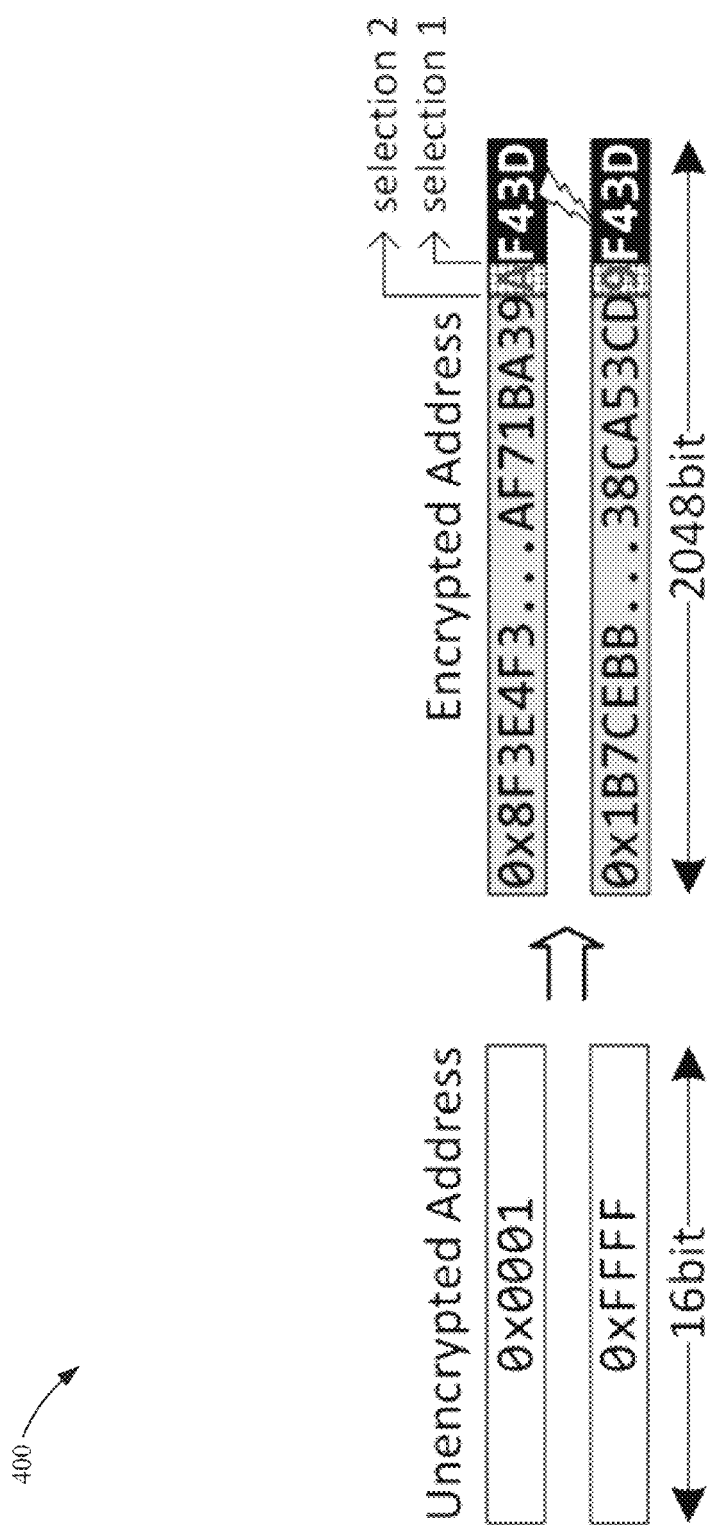
FIG. 4 is a flow diagram of a method of utilizing the lower bits of an encrypted address to differentiate various memory address according to an exemplary embodiment.

Optimization 1: Since the unencrypted domain is assumed 16 bits, the unencrypted main memory should support 16-bit addressing. While Paillier encryptions can be 2048-bit wide, in the encrypted domain only the lower bits of the 2048 bits are used to request memory addresses. Referring to FIG. 4, a flow diagram of a method 400 of utilizing the lower bits of an encrypted address to differentiate various memory address according to an exemplary embodiment. As shown in FIG. 4, the lower bits of an encrypted address are used to differentiate $2^{16}$ main memory addresses. In arrangements where only 16 bits are used to differentiate memory addresses (as shown in selection 1), there may be memory address collisions (e.g., two different pieces of data having an overlapping memory address). For example, as shown in FIG. 4, a collision of the encrypted memory addresses for the two pieces of data are demonstrated because the last 16 bits of the encrypted values of addresses 0x0001 and 0xFFFF are the same. Any memory values may have address collisions, not just the first and last values as shown in FIG. 4. In arrangements where 20 bits are used (as shown in selection 2), the chances of collision are greatly reduced as the 20 bit selection allows for proper separation of all memory locations.

Figure 5:
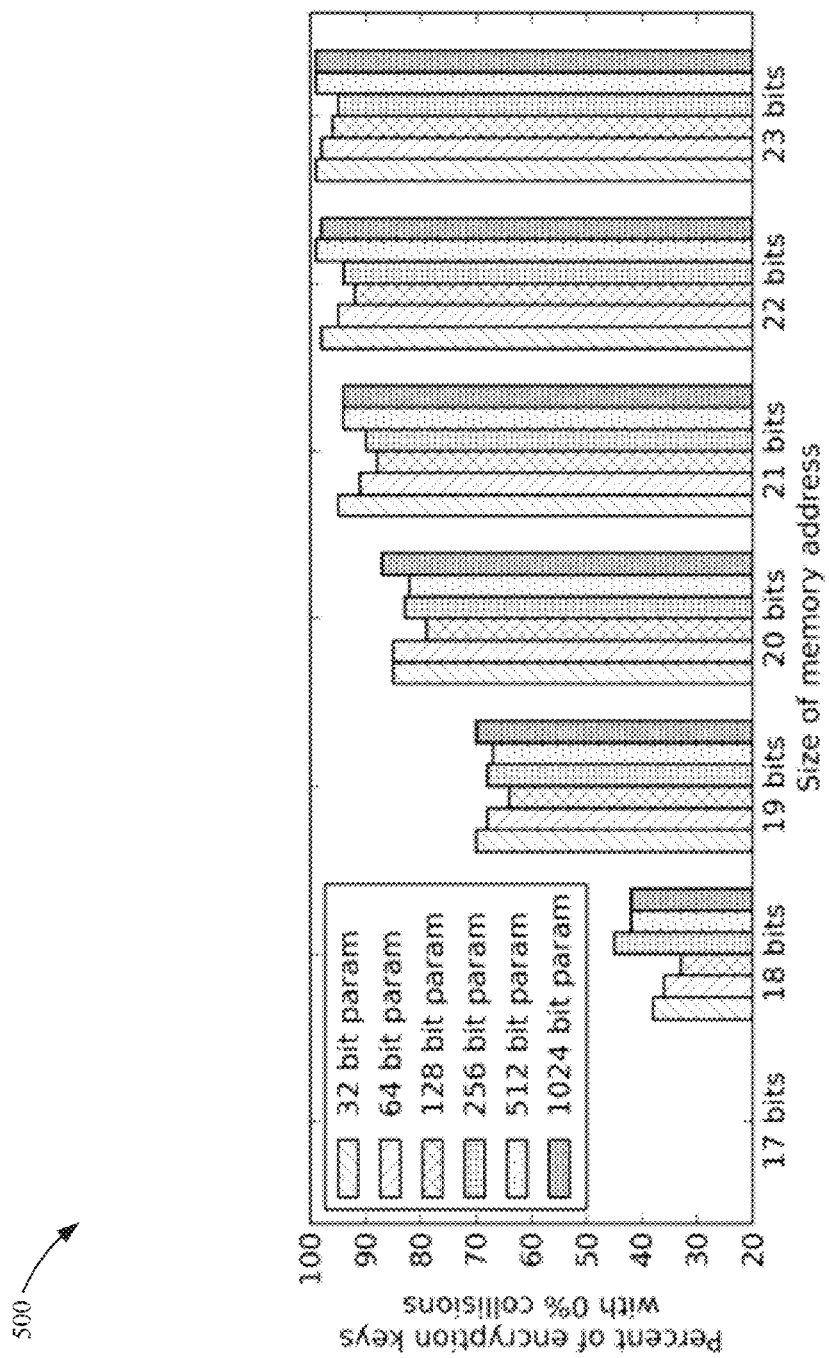
FIG. 5 is a bar graph that illustrates the percentage of encryption keys having a zero percent collision rate verses the size of the memory address according to an exemplary embodiment.

Referring to FIG. 5, a bar graph 500 that illustrates the percentage of encryption keys having a zero percent collision rate verses the size of the memory address is shown according to an exemplary embodiment. The bar graph 500 is based on $2^{17}$ encryptions for different memory addressing sizes and security parameter sizes. Graph 500 shows the minimum number of address bits necessary to discriminate at most $2^{17}$ different encrypted addresses (since the out of range lookup memory uses addresses up to $2^{17}$), given 100 random keys per security parameter size and a confidence interval of ≤9.8 for confidence level 95%. The results indicate that using only 22 bits of address size is sufficient to discriminate $2^{17}$ encrypted addresses with 90% probability. In case of a collision, memory re-encryption with another key is necessary. Collisions can only happen during initial encryption (i.e. before execution), so the collision hazard is not applicable during runtime. This first optimization reduces the memory address size (and thus the number of memory locations) to $2^{22}$, down from $2^{2048}$ (for the highest security parameter size). Without the first optimization, the HEROIC computing architecture 200 would be impractical due to the high number of collisions or the high memory requirement.

Optimization 2: A second observation is that, for the main memory, only $2^{16}$ out of $2^{22}$ addresses are used. Since every address points to a 2070-bit value (i.e. 2048+22 bits for argument matching, assuming a 1024-bit security parameter), there are many memory locations of very large width that remain unused. In order to reduce the number of these very wide encrypted memory locations, one level of indirection between two memories of different address sizes and content widths is used. The first (original) memory would have 22 bits of addressing size but only 16 bits of content width, pointing to the second (new) memory. The second memory would have 16 bits of addressing size but the content widths would be much larger to fit an encrypted value. This optimization effectively limits wasting memory locations of very large content width, reducing the main memory size down to 24.17 MB, instead of approximately 1 GB without the optimization. Similarly, after this optimization, the multiplicative inverse memory is reduced to 24 MBs instead of 1 GB. The two-level memory optimization is presented at the block diagram of the HEROIC computing architecture 200 of FIG. 2A (top left and right).

Optimization 3: A further optimization to the memory indirection presented above, is to use a Collision Resolve Unit ("CRU") to reduce the memory size requirement by about 5 times. To effectuate the memory reduction, the CRU translates the 22-bit (truncated) input address to a valid 16-bit output index for the secondary memory discussed earlier, by using a tagging scheme based on the six most significant bits of the input. Specifically, the CRU requires a smaller memory, addressed by the 16 least significant bits of the input, which store several tag-index pairs on every memory line. To select the correct output, the CRU retrieves the memory line corresponding to the aforementioned 16 least significant bits of the input, and then checks all 6-bit tags in the line to find a valid output index match. Since the CRU essentially implements a permutation, one match is guaranteed to be found.

An important observation that allows the CRU to reduce the memory requirements, is that each memory line has an expected upper limit for the number of necessary tag-index pairs per line. The 22-bit inputs are truncations of encrypted values, and thus, are uniformly distributed and indistinguishable from truly random values. Furthermore, the number of such inputs is exactly $2^{16}$ (i.e. there are holes in the 22-bit range). The expected maximum number of collisions per CRU line on this set of inputs is $\Omega(\log n/\log \log n)$, where n is the set size. The probability of having more than t collisions per CRU line is less than $2^{16} \, e^t t^{-t}$. Since the probability of having 11 collisions is about 1%, the HEROIC computing architecture 200 can provision up to 10 tag-index pairs per memory line, with very high probability of success.

Using the third optimization, the HEROIC computing architecture 200 can replace the $2^{22}$ by 16 bits indirection memory, with a $2^{16}$ by 220 bits CRU memory, which amounts to about five times less memory requirement than the non-optimized state. Furthermore, the CRU does not impose any execution overhead whatsoever to the implementation of the HEROIC computing architecture 200 since checking the 6-bit tags from a retrieved memory line is performed very efficiently in software, as well as in parallel in hardware. All memory indirections in the HEROIC computing architecture 200 can benefit from the CRU optimizations.

Jump Decisions in the Encrypted Domain

Another challenge in the HEROIC computing architecture 200 is determining the mathematical sign of the ALU output, in order to make the necessary branch decisions. Since the ALU result is also encrypted, its sign is unknown, and algebraically it is not possible to compare the result with zero. If it was possible to compare an encryption with known values, the encryption scheme would be easy to break by performing a binary search. Even though order preserving encryption schemes exist, such schemes are not homomorphic and cannot be used for the HEROIC computing architecture 200.

To address this issue, the HEROIC computing architecture 200 may utilize a sign lookup memory (loaded along with the encrypted program) that returns the mathematical sign of any encrypted (two's complement) value within a range of encrypted numbers. For the assumed unencrypted domain of 16 bits, the sign lookup memory can return the sign of all numbers in the range from 0 to ($2^{16}$−1), given their respective encryption as the lookup address as shown at 208 of FIG. 2B. The sign lookup memory also benefits from the first address truncation optimization and uses only 22 bits of memory address size.

Implementation

Two different variants of the HEROIC computing architecture 200 can be implemented: i) an RTL implementation for reconfigurable fabric, and ii) a software virtual machine. The two implementations are described in further detail below. In some arrangements, it is also possible to implement the HEROIC computing architecture 200 in an application-specific integrated circuit ("AISC"). An ASIC is a factory fabricated computer chip that is not reconfigurable in the manner that field-programmable gate arrays are (i.e., once an ASIC is made, it cannot be changed). Due to the expenses of the manufacture processes for ASICs, an ASIC Heroic computing system may be appropriate for mass production.

HEROIC in Reconfigurable Fabric

Figure 6A:
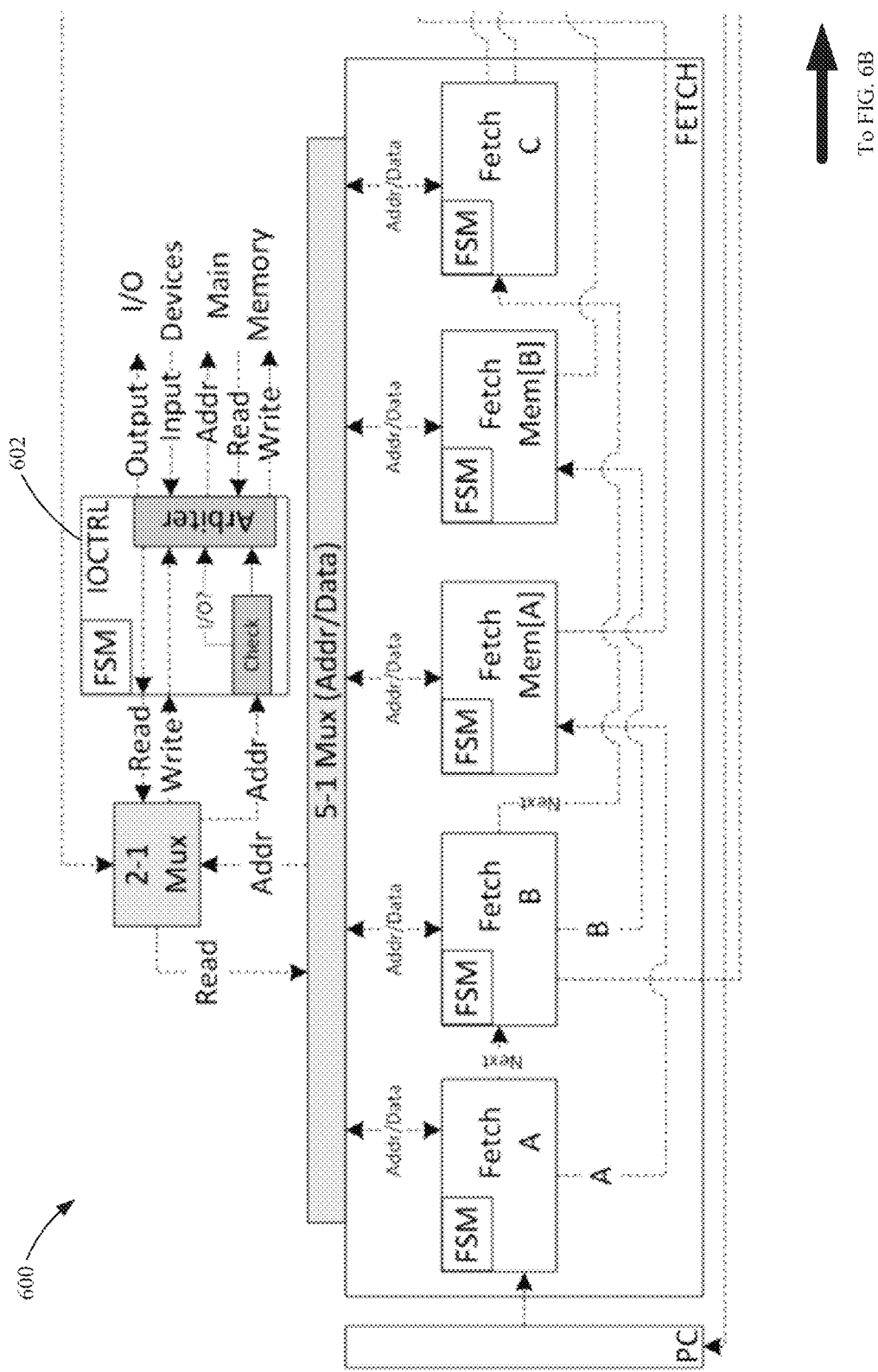
FIGS. 6A and 6B are an abstract view of a homomorphically encrypted one instruction computation encrypted computer system implemented for reconfigurable fabric according to an exemplary embodiment.
Figure 6B:
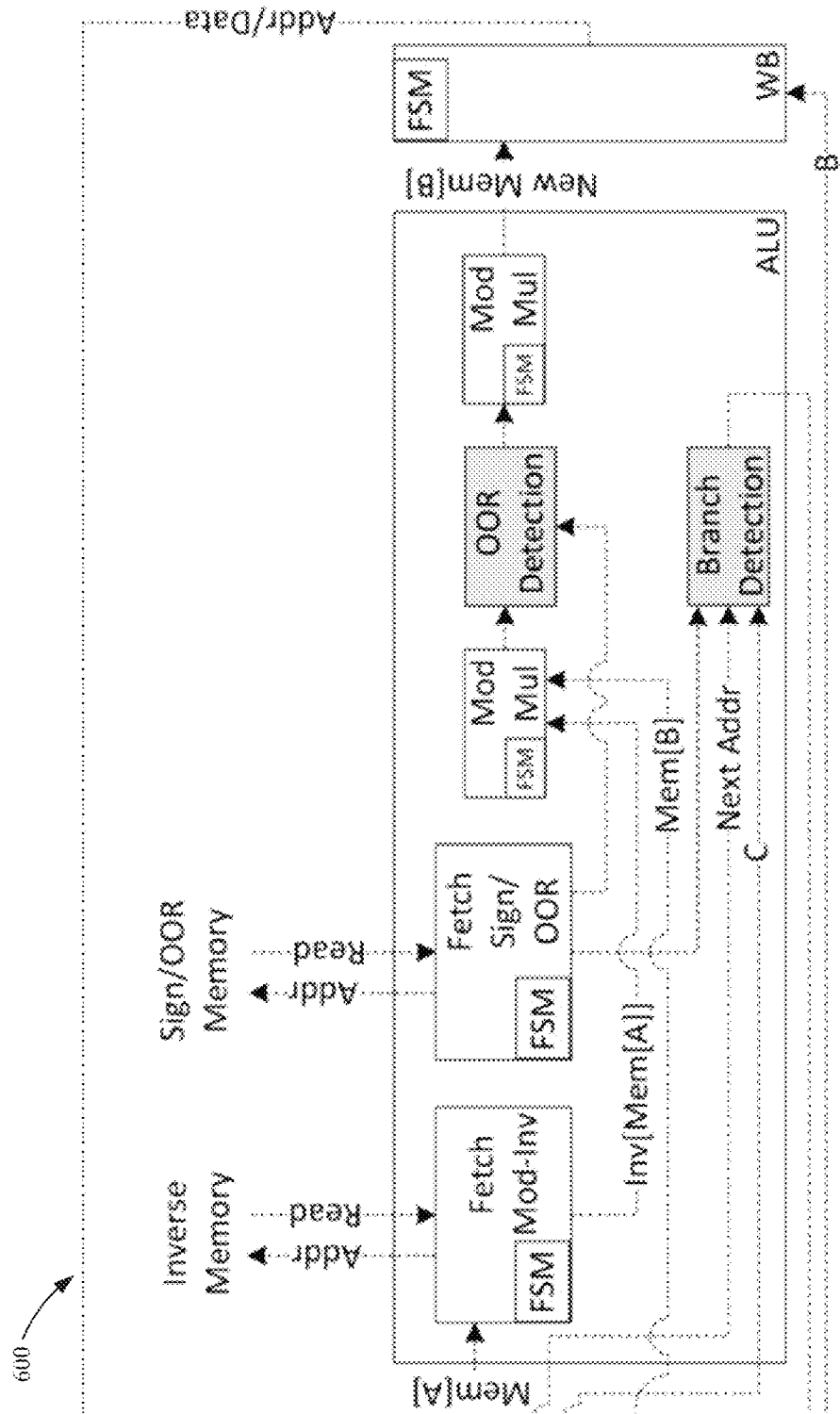

Referring to FIGS. 6A and 6B, an abstract view of a HEROIC encrypted computer system 600 implemented for reconfigurable fabric is shown according to an exemplary embodiment. In some arrangements, the HEROIC encrypted computer system 600 is the cloud storage system 102. A recent trend for boosting performance in data centers and make microprocessors even more versatile is to use FPGAs in collaboration with ASIC CPUs. Following this trend, an RTL implementation of the HEROIC computing architecture 200 is described. This implementation targets reconfigurable hardware (i.e. FPGA chips) and is fully parameterizable with regards to security parameter, memory word size, collision protection and supported machine code (subleq or addleq). The RTL implementation also takes advantage of the memory saving optimizations (as discussed above), and fast modular multiplication using the Montgomery algorithm. Additional details about the RTL design are presented in the following paragraphs.

The RTL design of HEROIC is implemented to be scalable and completely modular. This approach allows more robust testing and flexibility for future changes and further optimizations (e.g., parallel computing configurations). At a high level, the design consists of the CPU core connected to 3 memories. The first memory is the main memory. The main memory stores the instruction arguments and data values, which are encrypted, along with a pointer to the next element in sequence. The main memory uses the indirection optimizations as discussed above. The second memory is the inverse memory, which is a form of lookup memory. In the inverse memory, the modular multiplicative inverses of a range of encrypted values are stored to allow homomorphic subtraction (enabled only if subleq is used). The inverse memory may benefit from the indirection optimizations as well. The third memory is the sign and out-of-range memory, which is a form of lookup memory. In this lookup memory, the sign and out-of-range information necessary for branch decisions and out-of-range correction is stored as a pair of bits. Since the row width of this memory is small, it is not beneficial to use any memory indirection optimization.

The RTL design is using an input/output controller (IOCTRL) 602 that is interpolated between the CPU and main memory. This controller is responsible for interfacing with the outside world and for communicating input and outputs to/from the CPU over the memory bus, using reserved addresses through memory mapping. The controller uses its own state machine and supports double handshaking for input and output, which supports arbitrary I/O delays and makes the design very flexible.

The CPU module of the computer system 600 consists of three main units and two auxiliary units. The first main unit is a fetch unit. The fetch unit includes three "direct fetch" modules, each being responsible for retrieving arguments A, B, and C of each instruction from the main memory, as well as two "indirect fetch" modules that retrieve indirect arguments Mem[A] and Mem[B] (based on A and B retrieved earlier). Each module in the fetch unit is optimized for performance and is self-contained with individual state machines, so no separate control is necessary. All modules inside the fetch unit are synchronized using double handshaking and multiplexed over the same memory bus. The second main unit is an ALU unit. The ALU unit includes two modular Montgomery multipliers (one for homomorphic addition and one for out-of-range correction), a fetch module for sign/out-of-range lookup information, and an optional fetch module for multiplicative modular inverse information (in case subleq is used). The Montgomery multipliers are efficient and a result is produced in h+2 clock periods, when h is the bit-size of the given arguments. Furthermore, the sign information is used in this unit for branch decisions, which effectively determine the new PC value. The third main unit is a writeback unit. The writeback unit includes a single module responsible for writing the updated Mem[B] value, received from the ALU unit, back to memory. The writeback module is optimized as well, and communicates with the ALU using the double handshaking synchronization protocol discussed earlier. The module employs its own finite state machine and is multiplexed on the main memory bus as well. The two auxiliary units are two bus multiplexers. The two bus multiplexers are used to selectively connect different fetch units over the same memory bus, so that memory modules with only one port can be used. The first bus multiplexer is 5-to-1 and is used during argument fetching by the fetch unit. The second multiplexer is 2-to-1 and is used for switching between the 5-to-1 multiplexer (used for reading from memory), and the writeback unit (used for writing back to memory). These multiplexers are not implementation specific, but necessary for universal compatibility, since reconfigurable hardware does not always support the tristate buffers required for bus mastering.

The operation of the RTL design is described below. Initially, the program owner compiles the high level program source and generates single instruction machine code. Then, the owner generates a secret key, which is used to homomorphically encrypt each value in the machine code (i.e. data values and instruction arguments) along with sequencing information. The encryption/decryption key is only known to the owner and is never sent to the HEROIC processor (i.e., the cloud computing system 102 does not require the encryption/decryption key). Since each encrypted value is explicitly linked with the next one, the data can be encrypted individually and out of order under the same key (i.e. the HEROIC program encryption process is parallel). If a memory address collision occurs, the collision is detected at this initial stage and the owner can re-encrypt the data with a different key as necessary. After the homorphical encryption, the program owner post-processes the encrypted machine code, adding to each value a truncated address pointer to the next value in sequence, and randomly permuting the order of all values. After adding memory saving indirection, this becomes the main program memory. Then, the program owner generates sign/out-of-range memories, and in case of subleq, modular inverse memories (potentially using an indirection optimization). After generating the sign/out-of-range memories, all memories are loaded to the HEROIC processor (i.e., processor 108), along with the first PC value for execution. The processor 108 naturally generates encrypted outputs, which are collected by the program owner; these outputs, when decrypted, correspond to the expected program outputs.

The HEROIC design for reconfigurable hardware incorporates units that are designed to support different security parameter strengths. With trivial modifications, unit configuration can be dynamic during runtime for all units, while it is also possible to leverage dynamic reconfiguration features of modern FPGAs.

HEROIC Via a Virtual Machine

The HEROIC RTL implementation presented in the previous paragraphs provides protection against eavesdropping, but requires processor that is natively capable of processing in the HEROIC computing architecture 200 (i.e., an FPGA). To overcome this hardware constraint, a virtual machine may be leveraged, which generally provides a translation layer for porting one ISA over another. Accordingly, a HEROIC Virtual Machine ("VM") can provide the HEROIC computing architecture 200 and be the basis for the cloud computing system 102, which can be run on any commodity CPU. In some arrangements, the VM is implemented in C and runs natively (i.e. without emulating any hardware states or modules) using the GNU GMP multiple precision arithmetic library that is portable and already optimized for performance on different CPU architectures. The implemented VM is capable of executing encrypted HEROIC programs, receiving encrypted inputs at runtime, and generating encrypted outputs to program owners. On the program owner end, the VM implementation is supported by a special HEROIC Python library that wraps around encryption routines. This Python library can be used for program main memory encryption, input/output encryption and decryption, memory randomization/permutation, memory noise generation for extra security, memory indirection, intelligent collision detection, truncation of next-element-address pointers, and modular inverse memory generation. The VM may be used for event logging, statistics generation, and execution trail generation (useful for debugging).

A typical usage model for the HEROIC VM is to run (standalone or parallelized in multiple instances) on a cloud server (e.g., cloud computing system 102), where users can provide encrypted computation images and receive results. Since modern cloud servers offer great scalability, the use of HEROIC VM is not subject to memory size limitations that a single system may impose. Another exemplary use of the HEROIC VM is to act as a secure co-processor, where only security sensitive parts of a computation (e.g. proprietary algorithms/IP) are offloaded to the VM. The VM essentially provides a ready-to-use HEROIC implementation that can be executed as any other application on a server, while providing a secure and private environment for sensitive data.

The HEROIC VM implementation includes five main components. The first component includes the various memory routines used by the VM. The memory routines initialize and implement all memory related functionality, using the Python back-end library. These routines implement encrypted memory file parsers (for main memory, sign/out-of-range memory and optionally modular inverse memory), encrypted value converters to GMP multi-precision format arrays and memory lookup routines that fetch lookup values by directly indexing GMP memory arrays. The second component includes the homomorphic operation routines. The homomorphic routines are C routines used for homomorphic addition/subtraction with out-of-range and randomness correction. The most important function of the homomorphic routines is the modular multiplication operation, which is also performed directly by the ISA-optimized GMP routines. The third component includes input/output routines. The input/output routines are C routines that are responsible for communicating with the outside world using encrypted values. The program owner can optionally use the Python backend library to receive/decrypt the VM outputs, or to generate/send encrypted inputs to the VM. The fourth component includes a main execution loop. The main execution loop is a C routine that implements all steps of HEROIC execution, including: reading arguments, calling homomorphic operations, making branch decisions, updating the program counter and writing the main memory with computed values. The fifth component includes various support routines. The support routines are C routines that perform memory free operations (for memory leakage prevention), logging and generating debug information.

The above-described systems and methods provide a HEROIC computing system that is more secure than traditional computing systems that store and process encrypted data. The described HEROIC computing system provides a general-purpose encrypted computing system architecture that is capable of processing encrypted information natively without the need of sending encryption keys to the host machine. Accordingly, by eliminating the need for key exchange, the HEROIC architecture is more secure than traditional computing systems because attackers cannot target cryptographic keys stored in the computing system because they do not exist. Additionally, because the data being processed by the processor of the HEROIC computing system remains encrypted, any data retrieved by attackers is in the encrypted state and remains secure even in the event of a security breach. Accordingly, the HEROIC computing system protects the privacy of information stored and processed inside cloud computing systems against any information leakage or side channels, without the need of sharing keys or making any assumptions about the physical protections of the processor of the cloud computing system itself.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention as expressed in the appended claims.

What is claimed is:

1. A method of manipulating data in the encrypted domain, the method comprising:
   receiving, by an electronic processor, encrypted instructions and encrypted data;
   manipulating, by the electronic processor, the encrypted data based at least on the encrypted instructions, wherein manipulating the encrypted data comprises employing either a subtract and branch if less than or equal to zero instruction set or an add and branch if less than or equal to zero instruction set such that the manipulating comprises:
      applying a function on the encrypted data, wherein the function is a subtracting function or an adding function,
      comparing the result of the applied function to a condition, and
      branching based at least on the comparison; and
   generating, by the electronic processor, modified encrypted data based at least on the manipulation of the encrypted data.

2. The method of claim 1, further comprising receiving an incomplete portion of an encryption key corresponding to the encrypted instructions and encrypted data.

3. The method of claim 2, wherein the incomplete portion of the encryption key is insufficient to decrypt the encrypted instructions and the encrypted data.

4. The method of claim 1, wherein manipulating the encrypted data further comprises:
   determining the result of the applied function corresponds to a value outside a supported range of value; and
   adjusting the result based on a modular multiplicative inverse of an encrypted value.

5. The method of claim 1, wherein the encrypted instructions are based on a single instruction architecture of either a subleq instruction set or an addleq instruction set.

6. The method of claim 1, further comprising:
receiving a program;
converting the program into a reduced instruction type program;
encrypting the reduced instruction type program; and
differentiating operations in the encrypted reduced instruction type program.

7. The method of claim 1, further comprising:
retrieving an encrypted memory address from a first encrypted instruction, wherein the encrypted memory address corresponds to a second encrypted instruction; and
retrieving the second encrypted instruction based at least on the encrypted memory address.

8. The method of claim 1, wherein the encrypted data is partial-homomorphically encrypted data.

9. A computing system comprising:
one or more electronic processors configured to:
receive encrypted instructions and encrypted data;
manipulate the encrypted data based at least on the encrypted instructions by employing either a subtract and branch if less than or equal to zero instruction set or an add and branch if less than or equal to zero instruction set such that the manipulating comprises:
applying a function on the encrypted data, wherein the function is a subtracting function or an adding function,
comparing the result of the applied function to a condition, and
branching based at least on the comparison; and
generate modified encrypted data based at least on the manipulation of the encrypted data.

10. The system of claim 9, wherein the one or more electronic processors are further configured to receive an incomplete portion of an encryption key corresponding to the encrypted instructions and encrypted data.

11. The system of claim 10, wherein the incomplete portion of the encryption key is insufficient to decrypt the encrypted instructions and the encrypted data.

12. The system of claim 9, wherein the one or more electronic processors configured to manipulate the encrypted data are further configured to:
determine the result of the applied function corresponds to a value outside a supported range of value; and
adjust the result based on a modular multiplicative inverse of an encrypted value.

13. The system of claim 9, wherein the encrypted instructions are based on a single instruction architecture of either a subleq instruction set or an addleq instruction set.

14. The system of claim 9, wherein the one or more electronic processors are further configured to:
receive a program;
convert the program into a reduced instruction type program;
encrypt the reduced instruction type program; and
differentiate operations in the encrypted reduced instruction type program.

15. The system of claim 9, wherein the one or more electronic processors are further configured to:
retrieve an encrypted memory address from a first encrypted instruction, wherein the encrypted memory address corresponds to a second encrypted instruction; and
retrieve the second encrypted instruction based at least on the encrypted memory address.

16. A cloud computing system comprising:
a cloud storage database;
a network interface configured to send data and to receive data from a plurality of user devices over a network;
a memory; and
at least one electronic processor configured to:
receive encrypted data from one of the plurality of user devices, wherein the encrypted data is encrypted with a homomorphic encryption scheme,
manipulate the encrypted data without decrypting the encrypted data,
generate modified encrypted data based at least on the manipulation of the encrypted data, and
store the modified encrypted data in the cloud storage database;
wherein the at least one electronic processor includes an electronic processor based on a reduced instruction set computing architecture or a complex instruction set computing architecture, and wherein the manipulating of the encrypted data and the generating of modified encrypted data as achieved with a virtual machine executed by the processor.

17. The cloud computing system of claim 16, wherein the at least one electronic processor includes a processor based on a Turing-complete one instruction set computing architecture.

* * * * *